(12) United States Patent
Fonzes

(10) Patent No.: US 6,915,187 B2
(45) Date of Patent: Jul. 5, 2005

(54) METHOD FOR AUTOMATICALLY LOCATING A MOTOR VEHICLE RIGHT AND LEFT WHEELS

(75) Inventor: Georges Fonzes, Toulouse (FR)

(73) Assignee: Siemens VDO Automotive, Toulouse Cedex 1 (FR)

( * ) Notice: Subject to any disclaimer, the term of this patent is extended or adjusted under 35 U.S.C. 154(b) by 1 day.

(21) Appl. No.: 10/381,428

(22) PCT Filed: Sep. 25, 2001

(86) PCT No.: PCT/EP01/11069

§ 371 (c)(1),
(2), (4) Date: Mar. 25, 2003

(87) PCT Pub. No.: WO02/30692

PCT Pub. Date: Apr. 18, 2002

(65) Prior Publication Data

US 2003/0187563 A1 Oct. 2, 2003

(30) Foreign Application Priority Data

Oct. 11, 2000 (FR) .............................. 00 12974

(51) Int. Cl.[7] ................................. G06F 7/00
(52) U.S. Cl. ............................... 701/1; 701/69; 701/70; 701/72; 180/204
(58) Field of Search ................................. 701/1, 69, 70, 701/72, 79, 81; 180/197, 199, 204

(56) References Cited

U.S. PATENT DOCUMENTS 6,466,887 B1 * 10/2002 Weinbrenner ............... 702/141

FOREIGN PATENT DOCUMENTS

DE        198 56 861        6/2000

* cited by examiner

Primary Examiner—Gertrude A. Jeanglaude
(74) Attorney, Agent, or Firm—Young & Thompson

(57) ABSTRACT

A method of automatic location of the right and left wheels of a motor vehicle of the type comprising a step of automatic measurement of the centripetal acceleration of a wheel, the method being characterized in that it consists in comparing the theoretical centripetal acceleration ($A_i$) of a wheel in a straight line with the measured centripetal acceleration ($A_{iv}$) of this same wheel when cornering for a given vehicle speed (V), and for a given steering wheel angle (T), so as to determine whether the wheel is on the right or on the left of the vehicle.

20 Claims, 1 Drawing Sheet

METHOD FOR AUTOMATICALLY LOCATING A MOTOR VEHICLE RIGHT AND LEFT WHEELS

CROSS REFERENCE TO RELATED APPLICATIONS

This application is the 35 USC 371 national stage of international application PCT/EP01/11069 filed on Sep. 25, 2001, which designated the United States of America.

FIELD OF THE INVENTION

The present invention relates to a method of automatic location of the right and left wheels of a motor vehicle. More especially, but not exclusively, this method is implemented in association with a system for monitoring the pressure of the tires.

BACKGROUND OF THE INVENTION

Specifically, it is already known to continuously monitor the pressure inside the tires of a vehicle. These pressure measurements (possibly corrected as a function of the temperature and of the ageing of the tire or of any other parameter) are processed by computer and an alarm signal is emitted when the pressure of a tire is abnormal. The computer processing the pressure measurements can be installed on the wheel itself or at any appropriate place of the vehicle.

The pressure measurements are carried out by a specific sensor associated with each of the wheels. The pressure measurement associated with a code identifying the sensor is sent to a remote computer by this sensor. Of course, it is necessary for the computer to know how to attribute this identifying code to a sensor position on the vehicle. Thus after processing, the computer must be capable of saying that the pressure measurement associated with the identifying code X originates from the front right wheel (for example). To do this, it is necessary for the computer to learn the position, on the vehicle, of the sensor and its identifying code.

This learning can be performed manually. For example, the computer is placed in learning mode and requests the codes of each of the pressure sensors in a preset order. This learning method is however relatively slow. Furthermore, it must be repeated with each change of tire and has the drawback of compelling the driver to enter data into the computer of the vehicle. If the driver forgets to store the new code in memory after a change of tire, there is a risk of error in the position of a wheel exhibiting an abnormal pressure. This may have serious consequences.

It would appear appropriate to carry out this learning of the position of the wheels, automatically, while the vehicle is moving.

To do this, the following physical principle is used: when cornering, the inside wheels turn less quickly than the outside wheels.

However, trials carried out while allowing for the centripetal acceleration of each wheel show that deviations of speed between right and left wheel are of the order of 1 to 10% of the measured value (acceleration).

Knowing that standard accelerometers making it possible to measure the centripetal acceleration of the vehicle have a resolution of 1%, noise of ±10%, an error of ±15% and exhibit drifting with temperature and with time, it seems impossible to use the measurement of the centripetal acceleration of each wheel by using standard accelerometers, to determine by direct comparison which wheel is turning least quickly.

It is of course possible to use more accurate accelerometers, but the accuracy of measurement required here involves the use of very expensive and generally very fragile accelerometers. This solution is inapplicable in the automotive environment.

The aim of the invention is therefore to determine automatically the position of the right and left wheels of a vehicle by using standard accelerometers.

For this purpose, the present invention relates to a method of automatic location of the right and left wheels of a motor vehicle of the type comprising a step of automatic measurement of the centripetal acceleration of a wheel, said method being characterized in that it consists in comparing the theoretical centripetal acceleration of a wheel in a straight line with the measured centripetal acceleration of this same wheel when cornering for a given vehicle speed, and for a given steering wheel angle, so as to determine whether said wheel is on the right or on the left of the vehicle.

Thus, by comparing the acceleration of one and the same wheel in a straight line and when cornering, problems of dispersion of the accuracies of the various acceleration sensors, one with respect to another, are circumvented.

More especially, the present invention relates to a method of automatic location consisting firstly in:

a)—measuring the vehicle's steering wheel angle T and when this steering wheel angle is substantially zero (vehicle in a straight line), b)—measuring the centripetal acceleration $A_i$ of each of the wheels of the vehicle with the aid of a sensor associated with each of the wheels, and c)—determining a correction coefficient $k_i$ for each of the wheels according to the following law:

$$A_i = K_i V^2 \quad (1)$$

where $A_i$ is the straight-line centripetal acceleration measured on wheel i, and V is the speed of the vehicle, and consisting, subsequently, when the vehicle is cornering:

d)—in measuring the centripetal acceleration while cornering $A_{iv}$ of each of the wheels, e)—in forming the difference in acceleration $\Delta_i$ between the theoretical acceleration in a straight line $A_i$ for a given wheel i and a given speed V, and the acceleration measured while cornering $A_{iv}$ of this same wheel and at this same speed, $\Delta_i = A_{iv} - A_i$, that is to say $$\Delta_i = A_{iv} - K_i V^2 \quad (2)$$

f)—in forming the product of this difference $\Delta_i$ times T the angle of the steering wheel, $$(A_{iv} - K_i V^2) \times T \quad (3)$$

g)—in determining the sign of this product, as a function of a chosen convention, namely; negative steering wheel angle if cornering to the left (or the converse), and h)—deducing therefrom for each of the wheels its location on the left or right side of the vehicle.

Advantageously, a correction coefficient is calculated for each wheel when the vehicle is in a straight line. This makes it possible to intercompare the measurements made by the sensors on various wheels while circumventing, here again, errors and inaccuracies among the various sensors.

Advantageously, the present invention makes it possible to employ standard sensors and to obtain results with an error of less than 1%.

Advantageously, again by fixing a convention for the representation of the steering wheel angles (for example the negative steering wheel angles correspond to a cornering of the vehicle to the left), and by simply determining the sign of the following product:

$$(A_{iv} - K_i V^2) \times T$$

where $A_{iv}$ is the measurement of the acceleration of wheel i while cornering, $K_i V^2$ is the theoretical acceleration of wheel i in a straight line, and T the algebraic value of the steering wheel angle, it is possible to deduce therefrom whether the wheel i is a right or left wheel of the vehicle.

Specifically, assuming that the convention for measuring the steering wheel angle establishes that a cornering to the left has a negative angle, then when the vehicle is turning to the left, we obtain T<0. When a vehicle is turning to the left, its left wheel has a lower speed than this same left wheel on a straight line. Likewise, the acceleration of the left wheel when cornering is less than the acceleration of this same left wheel on a straight line. Therefore, the difference $\Delta_i$ between the acceleration measured while cornering and the theoretical acceleration in a straight line is less than 0. The product of T times $\Delta_i$ is therefore positive.

If for this same convention for measuring the steering wheel angle the product T times $\Delta_i$ is negative it is because the wheel i is a right wheel.

Thus, for the established convention for measuring the steering wheel angle (left=negative) the sign of the product $T \times \Delta_i$ indicates directly that wheel i is on the right when it is negative and that wheel i is on the left when it is positive.

Advantageously, to improve the accuracy of the locating of the right and left wheels, it is possible to redo the determination of the right and left wheels a number of times and to confirm it only when the same location has been found several times, for a given wheel.

Advantageously again by summing a plurality of $\Delta_i$ of one and the same wheel and comparing this sum with all the sums of the other wheels (choosing the negative steering wheel angle preset for cornering to the left), the largest two sums obtained correspond to the left wheels of the vehicle.

BRIEF DESCRIPTION OF THE DRAWINGS

Other objects, characteristics and advantages of the present invention will emerge from the description which follows by way of nonlimiting example and with reference to the appended drawings in which.

DETAILED DESCRIPTION OF THE INVENTION

Figure 1:
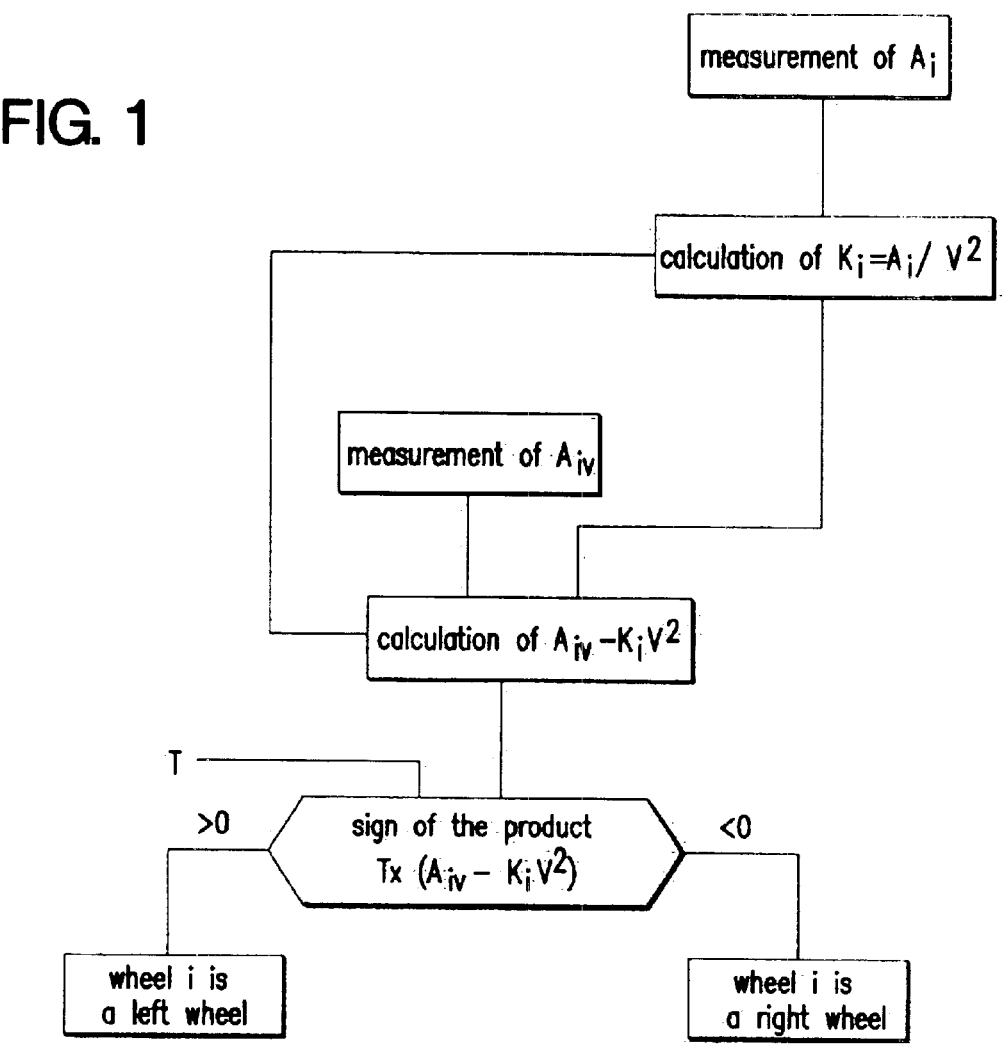
FIG. 1 is a diagrammatic view representing a schematic diagram of the method according to the invention.
Figure 2:
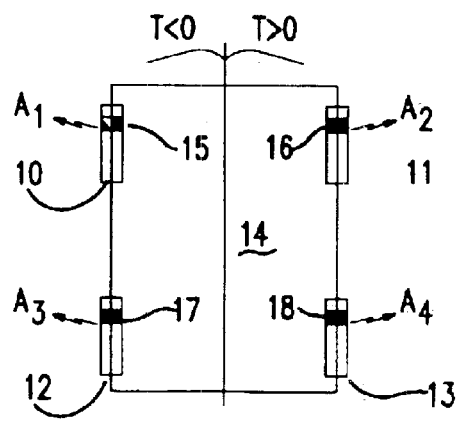
FIG. 2 is a diagrammatic view representing a vehicle furnished with four acceleration sensors.

As represented in FIG. 2, a vehicle 14 is furnished with at least four wheels 10 to 13. Each of these wheels is furnished with a standard centripetal acceleration sensor 15 to 18. These sensors are of course known and will not be detailed here.

The invention starts from the following principle, the inner wheel in a corner has a lower speed than the outside wheel in the corner. The invention resides more precisely in the fact that: the inside wheel in the corner has a lower speed than this same wheel when the vehicle is moving in a straight line. It follows from this observation that the acceleration of an inside wheel in a corner is less than the acceleration of this same wheel when the vehicle is moving in a straight line.

The vehicle 14 is moreover furnished with a sensor of steering wheel angle T well known per se. This sensor is in particular necessary for the control of power-assisted steering. It will be noted that within the framework of the present invention, it is imperative to know the direction of rotation of the vehicle. Consequently a convention is established for representing the direction of rotation of the vehicle. Namely, for example, when the vehicle is turning to the left the steering wheel angle T is negative (case represented in FIG. 2). Of course the reverse convention could also have been taken.

The vehicle 14 is also furnished with a conventional tachometer. Therefore the speed of movement V of the vehicle is known.

The method according to the invention consists firstly, when the vehicle is moving in a straight line:

—in measuring the centripetal acceleration $A_i$ of each of the wheels of the vehicle with the aid of the sensor associated with each of the wheels, and c)—in determining a correction coefficient $k_i$ for each of the wheels according to the following law:

$$A_i = K_i V^2 \tag{1}$$

where $A_i$ is the straight-line centripetal acceleration measured on wheel i, and V is the speed of the vehicle.

According to the invention, the vehicle 14 is considered to be moving in a straight line when the steering wheel angle T is less than 5°, that is to say substantially zero.

The centripetal acceleration of each wheel is measured continuously by the sensor associated with this wheel. Thus the centripetal acceleration $A_1$ of the wheel 10 is measured by the sensor 15 (likewise for each of the other wheels).

For each of the wheels, the correction coefficient $K_i$ is calculated as a function of the formula (1) given above. Specifically the speed V of the vehicle being known and the acceleration $A_i$ in a straight line being measured this coefficient $K_i$ is equal to $A_i/V^2$.

The correction coefficient $K_1$ for the wheel 10, $K_2$ for the wheel 11, $K_3$ for the wheel 12 and $K_4$ for the wheel 13 is thus determined. Of course, in order to consolidate the calculation of these coefficients, it is possible to average them, in order in fact to find an average $K_i$ for each of the wheels.

It should be noted that the calculation of the coefficients $K_i$ of each wheel is performed when the vehicle is moving in a straight line (T less than 5°) since this is the only moment at which relation (1) holds completely.

The calculation of the coefficient $K_i$ makes it possible to circumvent the disparities between various sensors, so as to obtain acceleration measurements which can be compared even if they originate from separate wheels.

Secondly, according to the invention, in order to further increase the accuracy of the measurement, the theoretical acceleration of a wheel in a straight line is compared with the acceleration of this same wheel when cornering, rather than intercomparing the acceleration of two wheels (one being inside the corner and the other outside). This allows any deviation in acceleration to be detected with better accuracy since the repeatability of a measurement with one and the same sensor is greater than 99%.

Thus, when it is detected that the vehicle is cornering (T greater than 5°), the acceleration of each wheel is measured while cornering $A_{iv}$.

The speed V of the vehicle is measured simultaneously. The theoretical acceleration $A_i$ which this same wheel would have had if it had been in a straight line is determined by calculation. For this purpose it is sufficient to form the product $K_iV^2$, doing so for each wheel.

The deviation existing between the acceleration measured while cornering $A_{iv}$ and the theoretical acceleration in a straight line $A_i$ is calculated for one and the same wheel, that is to say:

$$A_{iv}-A_i=A_{iv}-(K_iV^2)=\Delta_i \quad (2).$$

If the convention for representing the angles is as follows:
a steering wheel angle is negative when the vehicle is turning to the left, then when the vehicle is turning to the left the front left wheel 10 has a lower acceleration when cornering $A_{iv}$ than its acceleration $A_1$ in a straight line. Therefore $(A_{1iv}-A_1)$ is negative, that is to say $\Delta_1$ is negative. As the vehicle is turning to the left T is also negative! It follows that the product $T\times\Delta_1$ is positive.

It follows from this that the sign of the product:

$$\Delta_i\times T \quad (3)$$

gives an indication of the position of wheel i.

Thus, with the convention T negative when cornering to the left, the product:

a) $\Delta_i\times T$ is positive when wheel i is situated on the left of the vehicle, and b) $\Delta_i\times T$ is negative when wheel i is situated on the right of the vehicle.

The sign of the product $\Delta_i\times T$ for a given wheel i, is therefore directly indicative of the position of this wheel.

Of course, if the reverse convention had been adopted for the representation of the steering wheel angles (positive steering wheel angle when the vehicle is turning to the left), it would be sufficient to reverse cases a) and b) above.

The value of the product $\Delta_i\times T$ gives, for its part, an indication of the reliability index of the location found for this wheel. Specifically, the bigger the steering wheel angle T, the bigger the deviation between the acceleration while cornering and the acceleration in a straight line. Hence, the larger the value $\Delta_i\times T$, the more reliable the location of the wheel arising from this measurement.

Thus, if standard sensors were employed under optimum conditions, the sign of $\Delta_i\times T$ would be sufficient to indicate which side of the vehicle the corresponding wheel i is situated. However, this is not always the case.

Specifically, the sign of this product often fluctuates for several successive measurements. It is not therefore always possible to locate a wheel with a single measurement performed.

The present invention proposes in this case to perform the measurements and the corresponding calculations a number of times before definitively ruling as to the location of a wheel.

If several values of $\Delta_i$ are summed for wheel i, and this is done for each of the wheels, the two largest values found correspond to the left wheels of the vehicle (with the negative angle convention if vehicle is turning to the left). If the reverse convention had been taken, the two largest sums would correspond to the right wheels of the vehicle.

Instead of summing the $\Delta_i$ for each wheel it is also possible to average them. If the number of measurements is sufficient (typically greater than 10) then the two highest values correspond to the left wheels of the vehicle (still with the same basic convention).

When averages or a summation are done in this way, it is advantageous to delete the apparently outlying values of acceleration while cornering from these averages or sums. A value is considered to be an outlier if it differs, for example, by more than 10 g (g is the acceleration due to gravity) from the other values of accelerations found for the other wheels at the same moment.

It will be noted that in order to spare the battery of the acceleration sensors, the acceleration is measured every minute for example. As soon as the right and left location of the wheels is acquired, this method of location is interrupted, throughout the remainder of the journey. Experience shows that after a few minutes of movement of the vehicle the location of the wheels is acquired.

Thereafter if one of these wheels deflates abruptly or if an abnormal temperature and/or pressure situation arises, the computer (not represented) dealing with this function in the vehicle is capable of informing the driver that one of the right or left wheels exhibits a defect.

Of course when this method of location of the right and left wheels is combined with a method of location of the front and rear wheels, the system is then automatically informed of the exact position of each of its wheels. As soon as one of them exhibits a defect the system is then capable of informing the driver as to the exact position of the defective wheel.

Of course, the present invention is not limited to the embodiments described hereinabove. Thus it is possible to compare the measurements of accelerations originating from wheels mounted on one and the same axle so as to detect phenomena of wheel slide or slip. Likewise the limit value of 5°, for detecting the straight line movement of the vehicle may be slightly modified (as a function of vehicles).

What is claimed is:

1. A method of automatically determining a location of wheels of a motor vehicle (14) comprising:
    a step of automatic measurement of a centripetal acceleration $(A_i)$ of a wheel (i) by comparing the theoretical centripetal acceleration of the wheel in a straight line $(A_i)$ with the measured centripetal acceleration of this same wheel when cornering $(A_{iv})$ for a given vehicle speed (V), and for a given steering wheel angle (T), so as to determine whether said wheel (i) is on the right side or on the left side of the vehicle.

2. The method of automatic location as claimed in claim 1, wherein said measurement step comprises:
    a)—measuring the vehicle's steering wheel angle (T), when this steering wheel angle is substantially zero, the vehicle being in a straight line, b)—measuring the centripetal acceleration $(A_i)$ of each of the wheels (10 to 13) of the vehicle with the aid of a sensor (15 to 16) associated with each of the wheels, and
    c)—determining a correction coefficient $(k_i)$ for each of the wheels according to the following law:

$$A_i=K_iV^2 \quad (1)$$

where $A_i$ is the straight-line centripetal acceleration measured on wheel i, and V is the speed of the vehicle, and, subsequently, when the vehicle is cornering
    d)—measuring the centripetal acceleration while cornering $(A_{iv})$ of each of the wheels,
    e)—forming the difference in acceleration $\Delta_i$ between the theoretical acceleration in a straight line $(A_i)$ for a given wheel i and a given speed V, and the acceleration measured while cornering $(A_{iv})$ of this same wheel and at this same speed, $$\Delta_i=A_{iv}-K_iV^2 \quad (2)$$

f)—forming the product of this difference $\Delta_i$ times T the angle of the steering wheel, $$(A_{iv} - K_i V^2) \times T \quad (3)$$

g)—determining the sign of this product, as a function of a convention regarding cornering to the left or to the right, and h)—determining from the results of steps a) through g), for each of the wheels, each wheel's location on the left or right side of the vehicle.

3. The method of location as claimed in claim 2, wherein for a given wheel, one forms the difference between the acceleration measured while cornering and the theoretical acceleration in a straight line multiplied by an algebraic value of the steering wheel angle to determine whether said wheel is a right wheel or a left wheel of the vehicle.

4. The method as claimed in claim 2, wherein, the convention is that the sign of the steering wheel angle (T) when cornering to the left is a negative algebraic value, and a value of the sign found in step g) being positive indicates the wheel (i) on which the acceleration has been measured is a left wheel.

5. The method as claimed in claim 2, wherein, the convention is that the sign of the steering wheel angle (T) when cornering to the left is a positive algebraic value, and a value of the sign found in step g) being negative indicates the wheel (i) on which the acceleration has been measured is a left wheel.

6. The method as claimed in claim 1, wherein a plurality of differences in acceleration $\Delta_i$ are summed for a given wheel, and the sum obtained is compared with that of each of the other wheels.

7. The method as claimed in claim 6, wherein the largest two sums correspond:
  to the left wheels for the convention being cornering to the left equals negative steering wheel angle, and
  to the right wheels for the convention being cornering to the left equals positive steering wheel angle.

8. The method as claimed in claim 1, wherein for each wheel the differences in accelerations $\Delta_i$ of each wheel are averaged.

9. The method as claimed in claim 8, wherein the two largest averages correspond:
  to the left wheels for the convention being cornering to the left equals negative steering wheel angle, and
  to the right wheels for the convention being cornering to the left equals positive steering wheel angle.

10. The method as claimed in claim 2, wherein a plurality of differences in acceleration $\Delta_i$ are summed for a given wheel, and in that the sum obtained is compared with that of each of the other wheels.

11. The method as claimed in claim 3, wherein a plurality of differences in acceleration $\Delta_i$ are summed for a given wheel, and in that the sum obtained is compared with that of each of the other wheels.

12. The method as claimed in claim 4, wherein a plurality of differences in acceleration $\Delta_i$ are summed for a given wheel, and in that the sum obtained is compared with that of each of the other wheels.

13. The method as claimed in claim 5, wherein a plurality of differences in acceleration $\Delta_i$ are summed for a given wheel, and in that the sum obtained is compared with that of each of the other wheels.

14. The method as claimed in claim 2, wherein for each wheel the differences in accelerations $\Delta_i$ of each wheel are averaged.

15. The method as claimed in claim 3, wherein for each wheel the differences in accelerations $\Delta_i$ of each wheel are averaged.

16. The method as claimed in claim 4, wherein for each wheel the differences in accelerations $\Delta_i$ of each wheel are averaged.

17. The method as claimed in claim 5, wherein for each wheel the differences in accelerations $\Delta_i$ of each wheel are averaged.

18. The method as claimed in claim 14, wherein the two largest averages correspond:
  to the left wheels for the convention being cornering to the left equals negative steering wheel angle, and
  to the right wheels for the convention being cornering to the left equals positive steering wheel angle.

19. The method as claimed in claim 15, wherein the two largest averages correspond:
  to the left wheels for the convention being cornering to the left equals negative steering wheel angle, and
  to the right wheels for the convention being cornering to the left equals positive steering wheel angle.

20. The method as claimed in claim 16, wherein the two largest averages correspond:
  to the left wheels for the convention being cornering to the left equals negative steering wheel angle, and
  to the right wheels for the convention being cornering to the left equals positive steering wheel angle.

* * * * *